United States Patent
Li et al.

(10) Patent No.: US 9,705,671 B2
(45) Date of Patent: Jul. 11, 2017

(54) ONE-WAY KEY SWITCHING METHOD AND IMPLEMENTATION DEVICE

(71) Applicant: CHINA IWNCOMM CO., LTD., Xi'an, Shaanxi (CN)

(72) Inventors: Qin Li, Xi'an (CN); Manxia Tie, Xi'an (CN); Ning Bu, Xi'an (CN)

(73) Assignee: China IWNCOMM Co., LTD., Xi'an, Shaanxi (CN)

( * ) Notice: Subject to any disclaimer, the term of this patent is extended or adjusted under 35 U.S.C. 154(b) by 204 days.

(21) Appl. No.: 14/421,400

(22) PCT Filed: Jul. 15, 2013

(86) PCT No.: PCT/CN2013/079395
§ 371 (c)(1),
(2) Date: Feb. 12, 2015

(87) PCT Pub. No.: WO2014/026523
PCT Pub. Date: Feb. 20, 2014

(65) Prior Publication Data
US 2015/0222425 A1   Aug. 6, 2015

(30) Foreign Application Priority Data
Aug. 13, 2012  (CN) .......................... 2012 1 0286492

(51) Int. Cl.
H04L 9/08 (2006.01)
H04L 9/14 (2006.01)

(52) U.S. Cl.
CPC ............ H04L 9/0819 (2013.01); H04L 9/083 (2013.01); H04L 9/0891 (2013.01); H04L 9/14 (2013.01);
(Continued)

(58) Field of Classification Search
USPC .................................. 380/278, 273
See application file for complete search history.

(56) References Cited

U.S. PATENT DOCUMENTS

2007/0253554 A1* 11/2007 Chesson ............... H04L 63/068
380/273
2011/0150223 A1* 6/2011 Qi ........................ H04W 12/04
380/273

FOREIGN PATENT DOCUMENTS

CN         1494252 A    5/2004
CN       101645771 A    2/2010
(Continued)

OTHER PUBLICATIONS

Chinese Office Action, dated Mar. 3, 2016, from corresponding Chinese Application No. 201210286492.6.
(Continued)

Primary Examiner — Brandon Hoffman
Assistant Examiner — Samuel Ambaye
(74) Attorney, Agent, or Firm — Wolf, Greenfield & Sacks, P.C.

(57) ABSTRACT

A one-way key switching method and an implementation device. The method comprises: after obtaining a new key and before deducing or determining that at least n receivers obtain the new key, a sender setting the sending direction of the new key as unavailable and keeping the sending direction of an original key as available; after obtaining the new key and before deducing or determining that at least n receivers obtain the new key, before the original key is invalid, the sender starting up a key switching process, i.e. setting the sending direction of the original key as unavailable and setting the sending direction of the new key as available; where N≥n≥1, N is the total number of the receivers corresponding to the sender.

19 Claims, 7 Drawing Sheets

(52) U.S. Cl.
CPC .... *H04L 2209/24* (2013.01); *H04L 2209/601* (2013.01)

(56) References Cited

FOREIGN PATENT DOCUMENTS

| CN | 102075320 A | 5/2011 |
|---|---|---|
| CN | 102104870 A | 6/2011 |

OTHER PUBLICATIONS

International Search Report Oct. 24, 2013 from corresponding International Application No. PCT/CN2013/079395.

\* cited by examiner

ONE-WAY KEY SWITCHING METHOD AND IMPLEMENTATION DEVICE

This application is a national phase of International Application No. PCT/CN2013/079395, filed on Jul. 15, 2013, which claims the priority benefit of Chinese Patent Application No. 201210286492.6, filed with the Chinese State Intellectual Property Office on Aug. 13, 2012, which applications are hereby incorporated by reference to the maximum extent allowable by law.

FIELD

The present disclosure relates to the field of a key, and particularly to a one-way key switching method and an implementation device.

BACKGROUND

In order to prevent communication data in a communication network from being eavesdropped or altered by illegals, in a wireless network, a passive optical network or a power line communication network, even in a wired network, researchers commonly adopt a key to protect security of the communication data, ensure confidentiality of the communication data by protection, and ensure integrality of data by calculating an integrity check value. It is necessary for both a sender and a receiver of the data to know the key in those mechanisms for protecting the security of the data.

In order to prevent the key from being obtained by an illegal user by analyzing the intercepted data and thus prevent the communication data from being obtained or altered, it is necessary to update the key frequently. There are many ways to update the key. However, many key update mechanisms solves only the problem about how the two sides of communication obtain a new key, but do not concern the problem about how the sender and the receiver switch between the original key and the new key. Generally, the two sides of communication switch to the new key at different time instants. Once switching is conducted improperly, the receiver may be unable to de-protect data sent by the sender.

SUMMARY

A one-way key switching method and an implementation device are provided according to the present disclosure, for allowing a receiver to correctly de-protect data sent by a sender.

The present disclosure provides the following solutions.

A one-way key switching method includes:

setting a new key as unavailable in a sending direction and keeping an original key as available in the sending direction by a sender after reception of the new key, while before it is deduced or determined that the new key is obtained by at least n receivers;

starting a key switching process by the sender after reception of the new key and it is deduced or determined that the new key is obtained by at least n receivers, while before the original key becomes invalid, wherein the switching process comprises setting the original key as unavailable in the sending direction and setting the new key as available in the sending direction, where N≥n≥1, N is a total number of the receivers corresponding to the sender;

setting the new key as available in a receiving direction and keeping the original key as available in the receiving direction by the receiver on reception of the new key;

receiving, by the receiver, data sent by the sender, and selecting, by the receiver, a valid key from the original key and the new key according to a protection identifier of the data to de-protect the data; and starting, by the receiver, a key switching process, when the data is successfully de-protected using the new key for the first time while before the original key becomes invalid, wherein the switching process comprises setting the original key as unavailable in the receiving direction and keeping the new key as available in the receiving direction.

A sender device for implementing one-way key switching is further provided according to the present disclosure, which includes:

a first key obtaining unit configured to obtain a first new key;

a first key update unit configured to set the first new key as unavailable in a sending direction and keep an original key as available in the sending direction after reception of the first new key while before it is deduced or determined that the new key is obtained by at least n receivers;

a first key switching unit configured to start a key switching process after reception of the first new key and it is deduced or determined that the first new key is obtained by at least n receivers, while before the original key becomes invalid, wherein the switching process comprises setting the original key as unavailable in the sending direction and setting the first new key as available in the sending direction, where N≥n≥1, N is a total number of the receivers corresponding to the sender; and a protection unit configured to protect data to be sent to the receiver using the original key, in a case that the first new key is set as unavailable in the sending direction and the original key is set as available in the sending direction, and protect the data to be sent to the receiver using the first new key, in a case that the original key is set as unavailable in the sending direction and the first new key is set as available in the sending direction.

A receiver device for implementing one-way key switching is further provided according to the present disclosure, which includes:

a second key obtaining unit configured to obtain a second new key;

a second key update unit configured to set the second new key as available in a receiving direction and keep an original key as available in the receiving direction on reception of the second new key; a de-protection unit configured to select a valid key for de-protection from the second new key and the original key according to a protection identifier of data received from a sender, wherein the de-protection unit selects the original key to conduct de-protection in a case that the protection identifier indicates that the data is protected using the original key; or the de-protection unit selects the second new key to conduct de-protection in a case that the protection identifier indicates that the data is protected using the second new key; and a second key switching unit configured to start a key switching process and set the original key as unavailable in the receiving direction, after the data is successfully de-protected using the second new key for the first time while before the original key becomes invalid.

A device for implementing one-way key switching is further provided according to the present disclosure, which includes the sender device and the receiver device described above.

According to specific embodiments of the present disclosure, the following technical effects are disclosed according to the present disclosure.

According to the present disclosure, the sender sets the new key as unavailable in the sending direction on reception of the new key, and after it is deduced or determined that the new key is obtained by the receiver, the sender sets the new key as available in the sending direction and sets the original key as unavailable in the sending direction. Accordingly, it is avoided the case that data protected by the sender using the new key is received by the receiver before the new key is obtained, which will result in that the data cannot be de-protected. However, the new key and the original key are set as available by the receiver on reception of the new key, thereby it is ensured that the receiver can de-protect the data which is protected using the original and sent by the sender and the data which is protected using the new key after the sender switches to the new key. It can be seen, according to the present disclosure, the problem that the receiver cannot de-protect the protected data sent by the sender is solved by defining a new key switching sequence of the sender and the receiver.

BRIEF DESCRIPTION

The accompanying drawings to be used in the description of the embodiments will be described briefly as follows, so that the technical solutions according to the embodiments of the present disclosure or the conventional art will become clearer. It is obvious that the accompanying drawings in the following description are only some embodiments of the present application. For those skilled in the art, other accompanying drawings may be obtained according to these accompanying drawings without any creative work.

DETAILED DESCRIPTION

The technical solution according to the embodiments of the present disclosure will be described clearly and completely as follows in conjunction with the drawings in the embodiments of the present disclosure. It is obvious that the described embodiments are only some of the embodiments of the present disclosure. Other embodiments obtained by those skilled in the art based on the embodiments in the present disclosure fall into the scope of the present disclosure.

It should be noted that keys includes a one-way key and a two-way key in existing communication technique. The two-way key is used to protect data between the two sides of communication, in which the key used to conduct encryption or integrity check calculation on data to be sent to a peer entity by an entity is the same as the key used by the entity to conduct decryption or integrity check verification on data received from the peer entity. The one-way key is merely used to protect data in one direction, in which the key used to conduct encryption or integrity check calculation on data to be sent to the peer entity by the entity is different from the key used by the entity to conduct decryption or integrity check verification on data received from the peer entity.

Only the switching of the one-way key is explained in the embodiment of the present disclosure.

Figure 1:
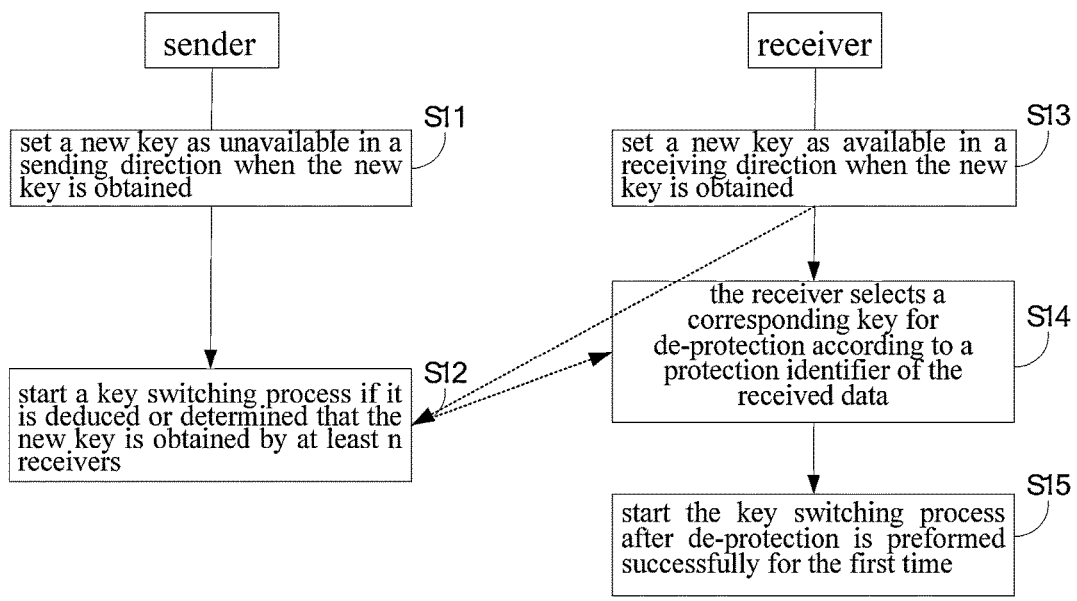
FIG. 1 is a flow chart of a method according to a first embodiment of the present disclosure.

Referring to FIG. 1, a one-way key switching method according to a first embodiment of the present disclosure includes the following steps S11 to S15.

In step S11, a new key is set as unavailable in a sending direction and an original key is kept as available in the sending direction by a sender after reception of the new key, while before it is deduced or determined that the new key is obtained by at least n receivers.

The key in the present disclosure is used to protect data to be sent by the sender, i.e., used to conduct encryption or integrity check calculation, and the key is further used to de-protect data received by the receiver, i.e., used to conduct decryption or integrity check verification.

In the present disclosure, the key being available in a sending direction means that the key can be used by the sender to protect data, while the key being unavailable in a sending direction means that the key cannot be used by the sender to protect data; and the key being available in a receiving direction means that the key can be used by the receiver to de-protect data, while the key being unavailable in a receiving direction means that the key cannot be used by the receiver to de-protect data.

The receiver may not obtain a new key at a time instant when the sender obtains the new key. The receiver may be not able to de-protect data protected using the new key in a case that the new key is directly set as available in the sending direction. Accordingly, according to the present disclosure, the new key is set as unavailable in the sending direction by the sender after reception of the new key. The sender protects data to be sent to the receiver using an original key after the new key is set as unavailable in the sending direction.

In step S12, after reception of the new key and it is deduced or determined that the new key is obtained by at least n receivers, while before the original key becomes invalid, a key switching process is started by the sender, that is, the original key is set as unavailable in the sending direction and the new key is set as available in the sending direction.

It can be seen from the explanation below that the receiver sets the new key as available in the receiving direction on reception of the new key. Accordingly, the sender deduces or determines that the new key is available for the receiver in the receiving direction if it is deduced or determined that the receiver obtains the new key. In this case, the sender may protect the data using the new key at any time instant thereafter, in other words, the sender may conduct key switching at any time instant thereafter.

Of course, it is necessary for the sender to start the key switching process before the original key becomes invalid since the key is valid during a certain period of time. The sender protects the data to be sent to the receiver using the new key after the key switching.

In step S13, the new key is set as available in a receiving direction and the original key is kept as available in the receiving direction by the receiver on reception of the new key. It should be noted that the original key is still available in the receiving direction in this case.

In step S14, the receiver selects a corresponding key for de-protection according to a protection identifier of the received data.

It is necessary to for the receiver to select a corresponding key for de-protection according to a protection identifier of the received data in a case that multiple effective keys are saved. The protection identifier is information such as a key identifier or a key index, which is used to identify that the data is protected using which key. Specifically, the receiver selects the original key to de-protect the data in a case that the protection identifier indicates that the data is protected using the original key. The receiver selects the new key to de-protect the data in a case that the protection identifier indicates that the data is protected using the new key.

According to the present disclosure, the receiver may not know when the sender switches the key. Thus, by setting the original key and the new key as available in the receiving direction at the same time, it is ensured that the receiver may de-protect the data which is sent by the sender and protected using either the original key or the new key.

In step S15, the receiver starts a key switching process and sets the original key as unavailable in the receiving direction, after the data is successfully de-protected using the new key for the first time.

If the receiver successfully conducts de-protection using the new key for the first time, it indicates that the sender switches the key. Then the receiver may switch the key correspondingly, that is, set the original key as unavailable in the receiving direction.

The packet loss often occurs in communication process. Accordingly, the data which is de-protected by the receiver successfully using the new key for the first time may not be the first data which is protected using the new key and sent by the sender.

In practice, the sequence of obtaining the new key by the sender and the receiver may not be fixed. Sometimes the sender obtains the new key earlier than the receiver, and sometimes the sender obtains the new key later than the receiver, or the sender and the receiver obtain the new key simultaneously. Accordingly, the sequence is not limited by serial numbers of the steps in the above-described embodiments, especially the serial numbers related to the operation steps of the sender and the receiver.

In a second embodiment of the present disclosure, as an example, the one-way key switching method is described in detail, by taking an entity A as the sender, taking an entity B as the receiver, taking a Key 0 as the original key, and taking a Key 1 as the new key. For simply of description, in the following example, tx represents the sending direction, rx represents the receiving direction, enable=1 represents available, enable=0 represents unavailable. For example, Key0.rx.enable=1 represents that the original key is available for a corresponding entity in the receiving direction; and Key1.rx.enable=0 represents that the new key is unavailable for the corresponding entity in the receiving direction.

Figure 2:
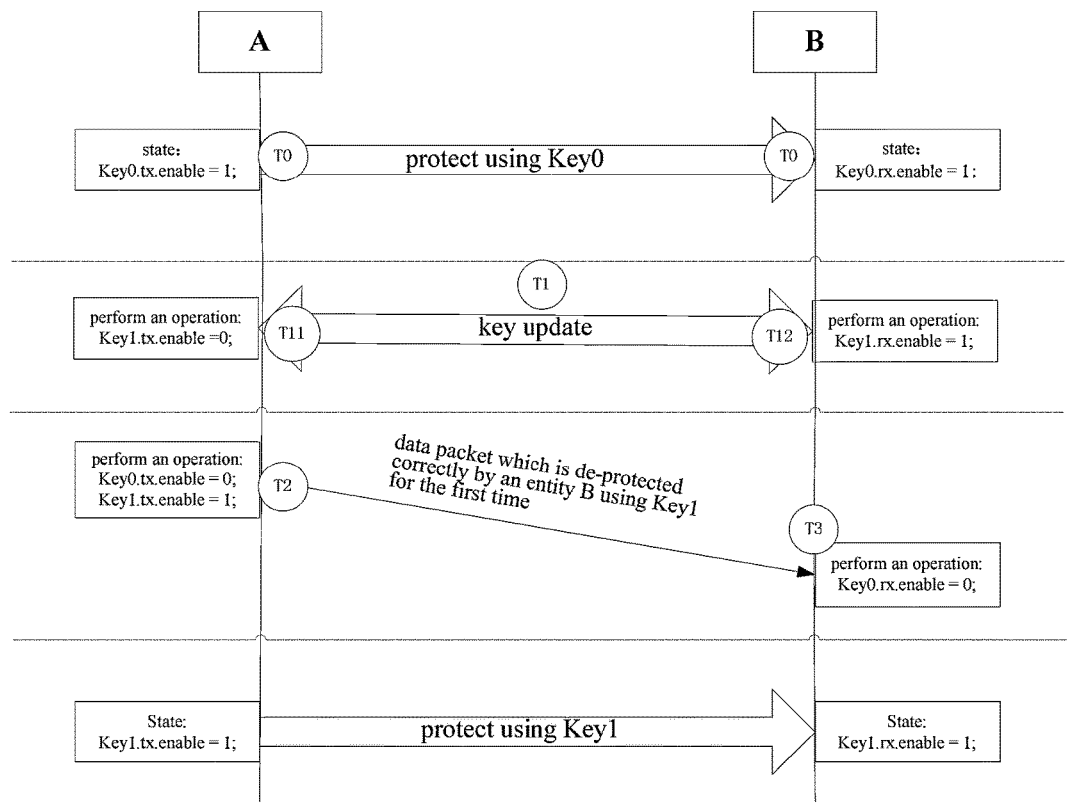
FIG. 2 is an example view of a second embodiment of the present disclosure.

Referring to FIG. 2, at a time instant T0, the entity A is in a state in which the original key is available for the entity A in the sending direction, and the entity B is in a state in which the original key is available for the entity B in the receiving direction. The data to be sent from the entity A to the entity B is protected using the original key Key0, and the entity B de-protects data received from the entity A using the original key Key0.

At a time instant T1, the entity A and the entity B perform the key update process, which ensures that the entity A and the entity B obtain the new key Key1. It should be noted, in this process, a time instant T11 when the entity A obtains the new key Key1 may be the same as or different from a time instant T12 when the entity B obtains the new key Key1. Specifically, at the time instant T11, the entity A performs an operation of setting the new key as unavailable in the sending direction (while keeping the original as available in the sending direction), and data to be sent from the entity A to the entity B is still protected using the original key Key0. At the time instant T12, the entity B performs an operation of setting the new key as available in the receiving direction (while keeping the original key as available in the receiving direction). Thus the original key and the new key are available for the entity B in the receiving direction. In a subsequent process, the entity B may select a corresponding key for de-protection according to the protection identifier of the data sent by the entity A. It is assumed that the protection identifier being 1 indicates that data is protected using the new key Key1, then the entity B may select the new key Key1 for de-protection once it is detected that the protection identifier of the received data is 1.

At a time instant T2, the entity A has deduced or determined that the entity B has obtained the new key, i.e., the new key is available for the entity B in the receiving direction. And the entity A performs key switching, i.e., performs an operation of setting the new key as available in the sending direction and setting the original key as unavailable in the sending direction. Then, if the entity A needs to send data to the entity B, the data is protected using the new key Key1 and sent to the entity B.

At a time instant T3, the entity B determines that the data is protected using the new key according to the protection identifier of the detected data, then the new key is selected to de-protect data from the entity A, and the entity B performs an operation of setting the original key as unavailable in the receiving direction after a successful de-protection for the first time.

So far, both the entity A and the entity B have completed the key switching. Then, the entity A is in the state in which the new key is available for the entity A in the sending direction, and the entity B is in the state in which the new key is available for the entity B in the receiving direction.

It should be noted, in the above-described example, since packet loss may occurs to data sent by the entity A, the data which is de-protected successfully by the entity B for the first time may not be the first data which is protected by the entity A using the new key.

In communication network, there are two communication modes: unicast and multicast. Unicast means that a single sender sends communication data to a single receiver. Multicast means that a single sender sends communication data to at least two receivers.

In the case of multicast, multiple receivers may not obtain the new key simultaneously. To ensure that all receivers may de-protect correctly, in a preferred embodiment of the present disclosure, the sender switches the key after it is deduced or determined that all the receivers obtain the new key.

In an embodiment of the present disclosure, there are many methods for the sender to deduce or determine that the receiver obtains the new key.

According to a third embodiment of the present disclosure, there are the following methods for the sender to deduce that the receiver obtains the new key.

First Method

In a case that the sender obtains the new key earlier than the receiver, the sender constructs a first key update message according to the new key, and sends the first key update message to the receiver such that the receiver obtains the new key according to the first key update message.

The sender starts the key switching process at a time instant of a first time interval after the first key update message is sent, wherein the first time interval is greater than a transmission delay taken by arrival of the first key update message to the receiver.

It takes a certain period of time for data transmission between the sender and the receiver. Considering that the transmission delay may occur in the communication delay due to factors such as a transmission distance or a transmission bandwidth, a delay time of data transmission has been determined in the conventional art. The data is considered to be transmitted to the receiver in a case that transmission time is greater than the delay time. Accordingly, in the present disclosure, in a case that the transmission time is greater than the delay time taken by the arrival of the first key update message to the receiver, the sender may deduce that the receiver has obtained the first key update message, and thus deduce that the receiver has obtained the new key.

Figure 3:
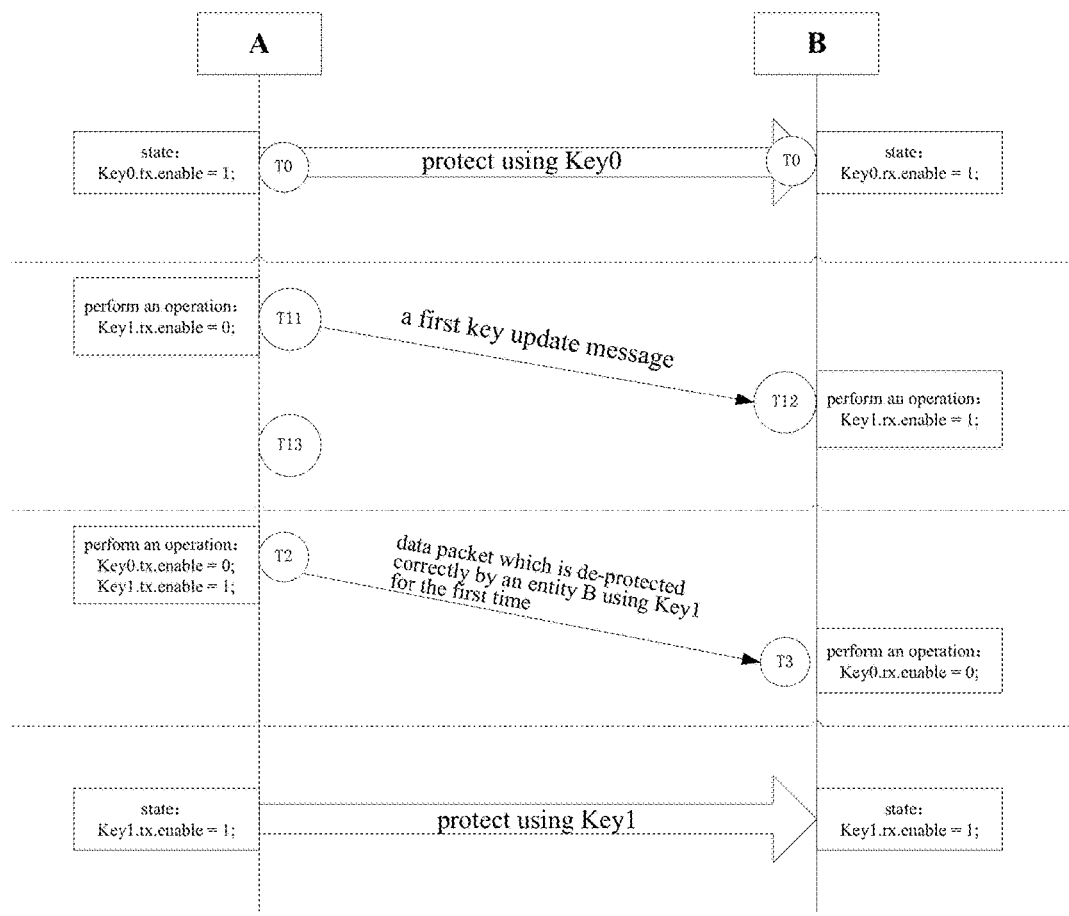
FIG. 3 is an example view of a third embodiment of the present disclosure.

FIG. 3 shows a specific implementation in which the sender deduces that the receiver has obtained the new key by the above-described first method and performs the key switching. Specifically, the entity A sets the new key as unavailable in the sending direction, constructs a first key update message and sends the first key update message to the entity B, after reception of the new key Key1 at the time instant T11, while before it is deduced or determined that the receiver obtains the new key. The entity B receives the first key update message at the time instant T12, obtains the new key Key1 from this message, and sets the new key as available in the receiving direction (while keeping the original key as available in the receiving direction).

The entity A starts the key switching at the time instant T2, sets the new key as available in the sending direction, and sets the original key as unavailable in the sending direction. Specifically, since the time interval between the time instant T2 and the time instant T11 is greater than the transmission delay taken by arrival of the first key update message to the entity B, T2 must be later than the time instant T12.

Second Method

In a case that the sender obtains the new key earlier than the receiver, the sender constructs the first key update message from the new key, and sends the first key update message to the receiver such that the receiver obtains the new key according to the first key update message.

The sender starts the key switching process at a time instant when data with a serial number of a first data frame number is sent to the receiver, and the first data frame number is set by the sender and sent to the receiver through the first key update message.

In communication, data is transmitted in a fixed frame format, and a data frame number represents the serial number of the transmitted data frame and is ascending in a data transmission process. For example, in the data communication between the entity A and the entity B, the data frame number hold by the data sent from the entity A to the entity B is denoted by the data frame number of A; the data frame number hold by the data sent from the entity B to the entity A is denoted by the data frame number of B. There is no correspondence between the data frame number of A and the data frame number of B, but the entity A and the entity B need to hold simultaneously current values of its own data frame number and data frame number of the opposite party, i.e., it is necessary to record the current value of A and the current value of B. The entity A receives data from the entity B, and the data frame number of B carried in this data cannot be less than the current value of B recorded by A. After the data is received correctly, the entity A may update the current value of the data frame number of B recorded by A according to value of the data frame number of B carried in the data. The entity B receives data from the entity A, and the data frame number carried in this data cannot be less than current value of A recorded by B. After the data is received correctly, the entity B may update the current value of the data frame number of A recorded by B according to the value of the data frame number of A carried in the data.

Accordingly, in the present disclosure, the first data frame number is greater than a current value of the data frame number of the sender, i.e., greater than the maximum of data frame numbers used by the sender before the first key update message is sent.

Additionally, to ensure that the sender can deduce that the receiver has obtained the new key at a time instant when data with the first data frame number is sent, according to the present disclosure, the time interval between the time instant when data with the data frame number which is the first data frame number is sent and the time instant when the first key update message is sent is greater than a transmission delay of the first key update message. Accordingly, the sender may deduce that the receiver has obtained the new key according to the first key update message at a time instant when the data with the first data frame number is sent to the receiver.

Still taking FIG. 3 as an example, it is assumed that a current data frame number is 60. The time instant T2 is the time instant when the data with the data frame number which is the first data frame number is sent, and the time instant T12 is the time instant when the first key update message arrives at the entity B. The first data frame number needs to be set to be greater than 60; and the first data frame number may be set as at least 60+20=80, if 20 data frames may be sent to the receiver during the transmission relay of the first key update message in current network, and therefore, the first data frame number may be set to be 100. Apparently, when the data with the data frame number 100 is sent to the entity B, the time instant when this data arrives at the entity B must be later than T12. At this time, the entity B has already obtained the new key in the first key update message, and may de-protect this data using the new key.

It should be noted, in the above-described second method, the receiver may know, according to the first data frame number in the first key update message, accurately that the data frame number of the data protected using the new key by the sender for the first time is the first data frame number. In this case, the receiver may select a valid key for de-protection according to the data frame number of the received data. Specifically, the new key is selected for de-protection in a case that the data frame number of the received data is the first data frame number or greater than the first data frame number, and otherwise the original key is selected for de-protection.

In practice, the data frame number may also be designed in a descending order. Contrary to the ascending case, the entity A receives data from the entity B, the data frame number carried in this data cannot be greater than a current value of B recorded by A; a corresponding first data frame number needs to be set as less than a current value of the data frame number of the sender, that is, less than the minimum of the data frame numbers of the sender used by the sender before the first key update message is sent.

As it should be, in the present disclosure, the sender may not send the first data frame number to the receiver.

In the above-described method, the first key update message includes first new key information which may be a ciphertext generated by protecting the new key by the sender using shared information between the sender and the receiver. The receiver may obtain the new key directly by de-protecting the first new key information using the shared information.

For example, in a case that the new key is 1, "1" is protected to generate a ciphertext which is the first new key information in the first key update message, then the receiver may obtains the new key 1 directly by de-protecting the first new key information. The shared information for protecting or de-protecting the new key may include: the original key shared between the sender and the receiver, a key dedicated to protect the new key in a key update process, or information on public and private keys of the sender and the receiver.

In a case that the new key is protected and de-protected using the public and private keys of the sender and the receiver, the new key is protected by the sender using a public key of the receiver and a private key of the sender, and the received key is de-protected by the receiver using the public key of the sender and the private key of the receiver.

In practice, in order to protect forward security of the key, the original key is not generally used to protect the new key in the key update process.

To prevent the first key update message from being intercepted in transmission and then prevent the new key from being revealed, in a preferred embodiment of the present disclosure, the first key update message may also be a ciphertext generated by the sender by protecting a first parameter such as first notification master key NMK using the shared information between the sender and the receiver. The first parameter is a parameter for calculating the new key by the sender and the receiver.

In practice, a key algorithm is agreed between the sender and the receiver, and then the sender calculates the new key according to the agreed key algorithm and the above-described first parameter. The receiver obtains the first parameter by de-protecting the first new key information using the shared information, and then calculates the new key according to the agreed key algorithm and the above-described first parameter.

In this way, a third party cannot obtain a corresponding new key even if the first key update message is known by the third party.

As it should be, the above is the preferred embodiment of the present disclosure, and the first new key information may be a plaintext of the new key or the first parameter in other embodiment.

In another preferred embodiment of the present disclosure, the first new key information may also be a second parameter which is a parameter for calculating the new key in conjunction with the shared key between the sender and the receiver.

In practice, a key algorithm is agreed between the sender and the receiver, then the sender calculates the new key according to the agreed key algorithm, the above-described second parameter and the shared key. The receiver also calculates the new key according to the agreed key algorithm, the above-described second parameter and the shared key.

Since the shared key between the sender and the receiver is unknown to other person, other person cannot obtain the new key by calculation although the second parameter is sent in form of plaintext.

As it should be, in order to further improve security, the sender may protect the second parameter using the shared information and then send it to the receiver. In a specific embodiment of the present disclosure, the first parameter or the second parameter have multiple forms. For example, the first parameter or the second parameter may be obtained from a code book. Of course, in consideration of security, the first parameter or the second parameter may be a first random number generated by the sender.

According to the present disclosure, there are many methods for the sender to determine that the receiver has obtained the new key. A common method is constructing a second key update message and sending the second key update message to the sender by the receiver on reception of the new key. Thus the sender may determine that the receiver has obtained the new key according to the received second key update message, and then the key switching may be performed.

In this method, the sender may be configured to start the key switching process at a time instant of a second time interval after the second key update message is obtained, and the second time interval is not greater than a remaining valid period of the original key.

As it should be, in the present disclosure, the sender may also be configured to start the key switching process at a time instant when data with the second data frame number is sent to the receiver. The second data frame number is set by the receiver and sent to the sender in the second key update message. The second data frame number is set to be greater than a current data frame number of the sender which is saved by the receiver. Since the second key update message has been received by the sender on reception of the second data frame number, that is, it has been determined that the receiver has obtained the new key, the receiver is sure to de-protect the data using the new key when data with the second data frame number sent by the sender arrives at the receiver.

In this mode, the receiver may know the data frame number of data protected using the new key by the sender for the first time in advance, i.e., the second data frame number. Accordingly, the receiver may also select a valid key for de-protection according to data frame number of the received data. Specifically, the new key is selected for de-protection in a case that data frame number of the received data is the second data frame number or greater than the second data frame number, and otherwise the original key is selected for de-protection.

Several methods for the sender to determine that the receiver has obtained the new key according to the second key update message are provided according to the fourth embodiment of the present disclosure.

First Method

In a case that the receiver has obtained the new key earlier than the sender, the receiver constructs a third key update message from the new key and sends the third key update message to the sender.

The sender determines that the receiver has obtained the new key according to the received third key update message. Accordingly, the sender may start the key switching process after the new key is obtained according to the third key update message.

In this method, the time instant when the sender obtains the new key is the same as the time instant when the sender learns that the receiver obtains the new key. In this case, the sender may start the key switching process upon reception of the new key according to the third key update message, and it is not necessary to set the new key as unavailable in the sending direction.

In the present disclosure, the receiver/the sender may consider that the sender/the receiver has not obtained the new key before the receiver/the sender learns that the sender/the receiver has obtained the new key.

In a preferred embodiment of the present disclosure, the sender may send a key update request message to the receiver before the new key is obtained, and thereby the receiver determines that the sender has not obtained the new key. Then the receiver may send the third key update message to the sender according to the request message upon reception of the new key.

Figure 4:
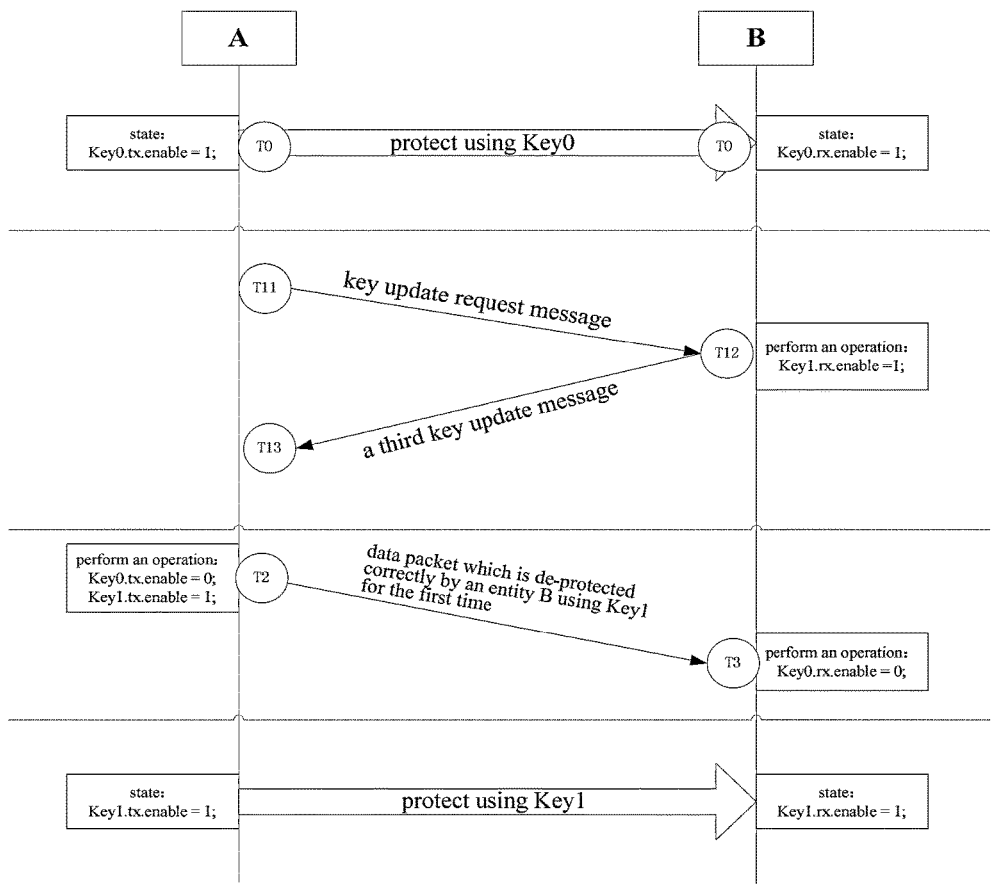
FIG. 4 is an example view of a first method according to a fourth embodiment of the present disclosure.

Still taking the entity A being the receiver and the entity B being the sender as an example, reference is made to FIG. 4 as follows.

At a time instant T0, the entity A is in a state in which the original key Key0 is available for the entity A in the sending direction, and the entity B is in a state in which the original key Key0 is available for the entity B in the receiving direction. Data to be sent from the entity A to the entity B is protected using the original Key0, and the entity B de-protects data received from the entity A using the original Key0.

At a time instant T11, the entity A sends the key update request message to the entity B, and the entity B thereby knows that the entity A has not obtained the new key.

At a time instant T12, the entity B obtains the new key, sets the new key as available in the receiving direction, constructs the third key update message and sends the third key update message to the entity A.

At a time instant T13, the entity A receives the third key update message and obtains the new key according to the third key update message.

At a time instant T2, the entity A performs a key switching process, sets Key1 as available in the sending direction and sets Key0 as unavailable in the sending direction. After that, the data to be sent to the entity B is protected by the entity A using Key1 and then sent to the entity B.

At a time instant T3, the entity B determines that the data is protected using the new key according to the protection identifier of the detected data, thus selects the new key to de-protect data from the entity A using Key1, and sets Key0 as unavailable in the receiving direction after the de-protection is performed successfully for the first time.

In the above-described process, the time instant T2 is later than or the same as the time instant T13. Specifically, the time instant T2 may be the time instant T13, a time instant that is a predetermined period after T13, such as a time instant of a second time interval after T13, or a time instant when data with the second data frame number is sent.

In the above-described method, the third key update message includes the second new key information.

In the present disclosure, the second new key information may be a ciphertext generated by the receiver by protecting the new key using the shared information between the sender and the receiver. The sender may obtain directly the new key by de-protection using the shared information.

The shared information for protecting or de-protecting the new key may be the original key, a key which is shared between the sender and the receiver and is dedicated to protect the new key in the key update process, or information on the public and private key of the sender and the receiver.

The receiver protects the received key using the public key of the sender and the private key of the receiver, and the sender protects the new key using the public key of the receiver and the private key of the sender, in a case that the new key is protected and de-protected using the public and private keys of the sender and the receiver.

In practice, in order to protect forward security of the key, the original key is not generally used to protect the new key in the key update process.

To prevent the third key update message from being intercepted in transmission and thus prevent the new key from being revealed, in a preferred embodiment of the present disclosure, the second new key information included in the third key update message may be a ciphertext generated by the receiver by protecting a third parameter using the shared information between the sender and the receiver. The third parameter is a parameter which is used by the sender and the receiver to calculate the new key, such as a notification master key. In practice, a key algorithm is agreed between the sender and the receiver, and then the sender and the receiver calculate the new key according to the agreed key algorithm and the above-described third parameter. In this case, although the third key update message is known by other person, the person only obtains the ciphertext of the third parameter, but cannot obtain the second parameter and the key algorithm, and therefore, the person cannot obtain the new key by calculation.

In another preferred embodiment of the present disclosure, the second new key information may be a fourth parameter which is a parameter for calculating the new key in conjunction with the shared key between the sender and the receiver.

In practice, a key algorithm is agreed between the sender and the receiver, and then the receiver calculates the shared key according to the agreed key algorithm, the above-described fourth parameter and the shared key. The sender also calculates the new key according to the agreed key algorithm, the above-described fourth parameter and the shared key.

In this mode, although the third key update message is known by other person, the person cannot obtain a corresponding new key because the person cannot obtain the shared key.

As it should be, in order to further improve security, the sender may also protect the fourth parameter using the shared information and then send the fourth parameter to the receiver.

To further embody that the new key is agreed between the sender and the receiver, in a preferred embodiment of the present disclosure, the sender and the receiver may also generate the new key in conjunction with a random number generated by the sender.

For example, in a case that the second new key information is a fifth parameter, the sender and the receiver may obtain the new key using the agreed key algorithm, the fifth parameter and the second random number from the sender. The fifth parameter is a parameter for generating the new key, and the second random number is included in the key update request message.

For example, in a case that the second new key information is a sixth parameter, the sender and the receiver obtain the new key using the agreed key algorithm, the sixth parameter, a third random number from the sender and the shared key. The sixth parameter is a parameter for calculating the new key in conjunction with the shared key between the sender and the receiver, and the third random number is included in the key update request message.

In a specific embodiment of the present disclosure, the third parameter, the fourth parameter, the fifth parameter and the sixth parameter may have multiple forms. For example, they may be obtained from a code book. As it should be, in consideration of security, they may be a fourth random number generated by the receiver.

The receiver generates the new key according to the fourth random number, and sends the fourth random number to the sender in the third key update message. Then the sender obtains the new key by calculation from this message.

Second Method

In a case that the sender obtains the new key earlier than the receiver, the sender constructs a fourth key update message and sends the fourth key update message to the receiver, such that the receiver obtains the new key according to the fourth key update message.

Specifically, the fourth key update message may be a ciphertext generated by the receiver by protecting the new key using the shared information, a ciphertext generated by the receiver by protecting a certain parameter for generating the new key using the shared information, or a parameter for generating the new key in conjunction with the shared key between the sender and the receiver, in particular, a random number generated by the receiver.

In this case, the process of sending the second key update message to the sender by the receiver on reception of the new key includes the following steps.

The receiver sends a fifth key update message to the sender after the new key is obtained according to the fourth key update message, to notify the sender that the receiver obtains the new key.

The sender determines that the receiver has obtained the new key according to the fifth key update message. Accordingly, the sender may start the key switching process after the fifth key update message is obtained.

In the present disclosure, the sender may be set to start the key switching process at a time instant that is a certain time interval after the fifth key update message is obtained.

In a case that the time interval is zero, it is indicated that the sender starts the key switching process immediately after the fifth key update message is obtained.

Figure 5:
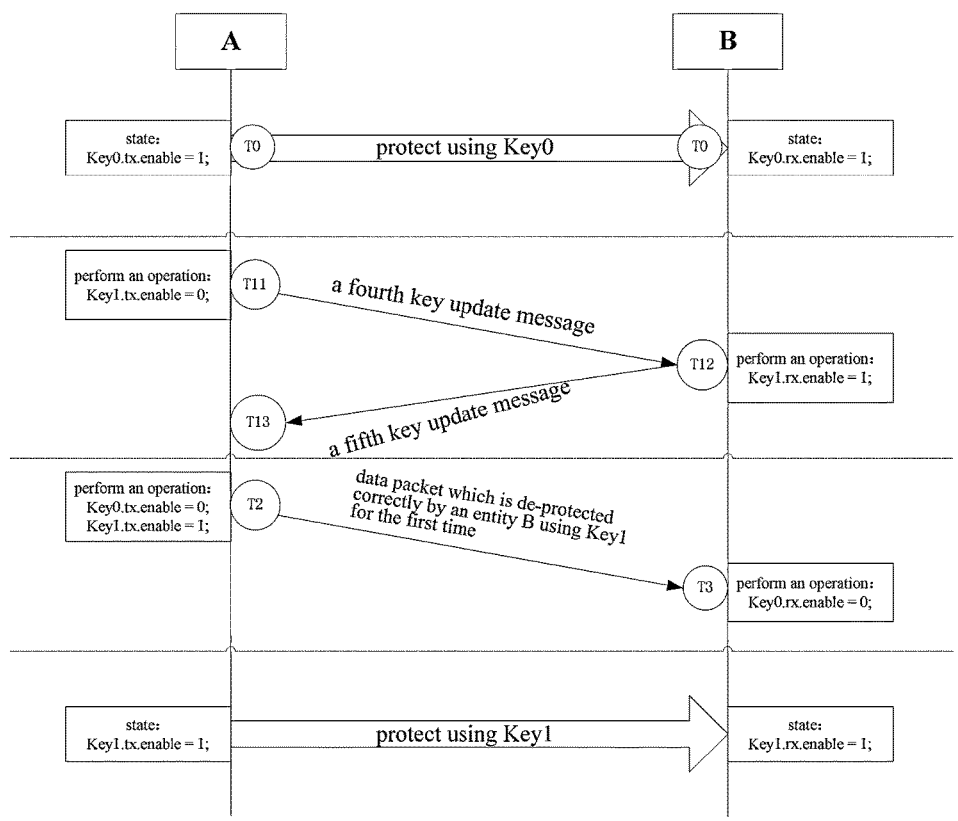
FIG. 5 is an example view of a second method according to the fourth embodiment of the present disclosure.

Referring to FIG. 5, the entity A sets the new key Key1 as unavailable in the sending direction after the new key Key1 is obtained at the time instant T11, constructs a fourth key update message and sends the fourth key update message to entity B. The entity B receives this message at the time instant T12, obtains the new key Key1 according to this message, and sets Key1 as available in the receiving direction.

The entity B constructs a fifth key update message and sends the fifth key update message to the entity A at the time instant T12.

The entity A receives the fifth key update message at the time instant T14, and determines that the entity B obtains the new key according to the message.

The entity A starts the key switching at the time instant T2, and sets the new key Key1 as available in the sending direction while setting the original key Key0 as unavailable in the sending direction. The time instant T2 is later than or the same as a time instant T14. In a case that the time instant T2 is the same as the time instant T14, the entity A starts the key switching process immediately after the fifth key update message is received.

The fifth key update message in the above-described method is a message for notifying the sender that the receiver has obtained the new key. Accordingly, information on the new key may not be included in this message, and the message may be, such as a notification message of "the new key is obtained".

As it should be, in a preferred embodiment of the present disclosure, to facilitate the sender to verify whether the new key obtained by the receiver is correct, the receiver may set the new key in the fifth key update message, such as "the new key 5 has been obtained", then the sender may verify whether the new key of the receiver is correct meanwhile. To prevent the fifth key update message including the new key from being intercepted in transmission, the receiver may encrypt the fifth key update message using the shared information between the receiver and the sender.

In a case that associated information on the new key is included in the fifth key update message, the fifth key update message may be a ciphertext generated by the receiver by encrypting the new key using the shared information, or a ciphertext generated by the receiver by encrypting associated parameter received from the fourth key update message using the shared information.

After the key switching, the new key becomes a current key, here the sender or the receiver saves the original key and the new key. To avoid that the current key cannot be determined accurately in subsequent update, in a preferred embodiment of the present disclosure, the new key and the original key may be processed properly after the key switching to distinguish the new key and the original key. There are several processing methods as follows.

The sender or the receiver may store the new key in a permanent storage area of the current key after the key switching process is started. In this case, the current key may be determined directly according to the storage location in a next update.

Alternatively, the sender or the receiver may delete the original key after the key switching process is started. Thus only one key is saved, and no distinguish is necessary.

Alternatively, the sender or the receiver directs an identifier indicating the current key to the new key. Then the current key may be determined according to the identifier.

Figure 6:
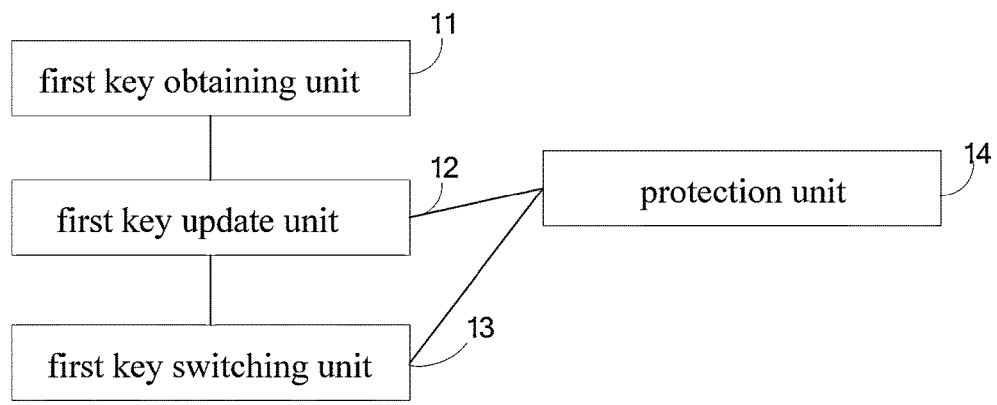
FIG. 6 is a structural diagram of a device according to a fifth embodiment of the present disclosure.

Corresponding to the above-described method, a sender device for implementing one-way key switching is provided according to a fifth embodiment of the present disclosure. Referring to FIG. 6, the device includes a first key obtaining unit 11, a first key update unit 12, a first key switching unit 13, and a protection unit 14.

The first key obtaining unit 11 is configured to obtain a first new key.

The first key update unit 12 is configured to set the first new key as unavailable in a sending direction and keep an original key as available in the sending direction after reception of the first new key while before it is deduced or determined that the new key is obtained by at least n receivers.

The key in the present disclosure is configured to protect data to be sent by the sender, i.e., to encrypt or calculate integrity verification, and to de-protect data received by the receiver, i.e., to decrypt or verify integrity verification.

In the present disclosure, the key being available in a sending direction means that the key can be used by the sender to protect communication data, while the key being unavailable in the sending direction means that the key cannot be used by the sender to protect communication data; and the key being available in the receiving direction means that the key can be used by the receiver to de-protect the communication data, while the key being unavailable in the receiving direction means that the key cannot be used by the receiver to de-protect communication data.

The first key switching unit 13 is configured to start a key switching process after reception of the first new key and it is deduced or determined that the first new key is obtained by the receiver, while before the original key becomes invalid, that is, set the original key as unavailable in the sending direction and set the first new key as available in the sending direction. The receiver sets the first new key as available in the receiving direction after reception of the first new key.

The protection unit 14 is configured to protect the communication data using a valid key. That is, the protection unit 14 is configured to protect the communication data using the original key before the first key switching unit sets the original key as unavailable in the sending direction and sets the first new key as available in the sending direction, and protect the communication data using the first new key after the first key switching unit sets the original key as unavailable in the sending direction and sets the first new key as available in the sending direction.

In communication network, there are two communication modes: unicast and multicast. Unicast means that a single sender sends communication data to a single receiver. Multicast means that a single sender sends communication data to at least two receivers.

In the case of multicast, multiple receivers may not obtain the new key simultaneously. To ensure that all receivers may de-protect correctly, in an embodiment of the present disclosure, the first key switching unit enables the sender to switch the key after the sender deduces or determines that all the receivers obtain the first new key.

In the present disclosure, there are various devices for deducing or determining that the receiver has obtained the new key.

Several devices for starting the key switching when it is deduced that the receiver obtains the new key are provided according to a sixth embodiment of the present disclosure.

First Device

A first key update message sending unit is configured to construct a first key update message and send the first key update message to the receiver in a case that the sender device has obtained the first new key earlier than the receiver such that the receiver obtains the first key update message according to the first key update message, and the first key update message includes the first new key information.

A first key switching unit is configured to start the key switching process at a time instant that is a first time interval after the first key update message is sent, and the first time interval is greater than a transmission delay taken by arrival of the first key update message to the receiver.

It takes a certain period of time for data transmission between the sender and the receiver. Considering that the transmission delay may occur in the communication delay due to factors such as a transmission distance or a transmission bandwidth, a delay time of data transmission is determined in the conventional art. The data is considered to be transmitted to the receiver in a case that transmission time is greater than the delay time. Accordingly, in the present disclosure, in a case that the transmission time is greater than the delay time taken by arrival of the first key update message to the receiver, the sender may deduce that the receiver has obtained the first key update message, and thus deduce that the receiver obtains the new key.

Second Device

A first key update message sending unit is configured to construct a first key update message and send the first key update message to the receiver in a case that the sender device has obtained the first new key earlier than the receiver.

A first key switching unit is configured to start the key switching process at a time instant when data with a first data frame number is sent to the receiver, the first data frame number is greater than the maximum of data frame numbers used before the first key update message is sent, and the time interval between the time instant when data with the first data frame number is sent and a time instant when the first key update message is sent is greater than a transmission delay taken by arrival of the first key update message to the receiver.

In communication, data is transmitted in a fixed frame format, and a data frame number represents the serial number of the transmitted data. The first data frame number is set to be greater than the maximum of data frame numbers used before the first key update message is sent, and the time interval between the time instant when data with the first data frame number is sent and the time instant when the first key update message is sent is set to be greater than a transmission delay taken by the arrival of the first key update message to the receiver. Thereby it may be deduced that the receiver has obtained the new key according to the first key update message when data with the first data frame number is sent to the receiver.

To ensure that security of the first new key information in the key update message to be sent to the receiver, in a specific embodiment of the present disclosure, the device further includes a first new key unit which is configured to generate the first new key information by protecting the first new key using the shared information between the sender and the receiver.

For example, in a case that the new key is 1, "1" is protected to generate the first new key information, and the receiver may obtain the new key 1 directly by de-protecting the first new key information using the shared information.

Alternatively, to prevent the first key update message from being intercepted in transmission and thus prevent the new key from being revealed, in a preferred embodiment of the present disclosure, the device may also include a first parameter unit which is configured to generate the first new key information by protecting the first parameter using the shared information shared with the receiver. The first parameter is a parameter for generating the first new key, such as a first notification master key NMK.

Alternatively, the first new key information is a second parameter which is a parameter for calculating the first new key in conjunction with the shared key shared with the receiver. In this case, the first key obtaining unit is configured to obtain the first new key using the agreed key algorithm, the second parameter and the shared key.

The first parameter or the second parameter described above may have multiple forms. For example, the first parameter or the second parameter may be obtained from a code book. As it should be, in consideration of security, the first parameter or the second parameter may be a first random number generated by a first random number unit of the device.

The above-described shared information may be the original key shared between the sender and the receiver, a key dedicated to protect the new key in the key update process, or information on the public and private keys of the sender and the receiver.

In a case that the new key is protected or de-protected using the public and private keys of the sender and the receiver, the new key is protected by the sender using a public key of the receiver and a private key of the sender, and the received key is de-protected by the receiver using the public key of the sender and the private key of the receiver.

In practice, in order to protect forward security of the key, the original key is generally not used to protect the new key in the key update process.

There are various devices for starting the key switching on determining that the receiver has obtained the new key. Common devices are as follows.

A first key switching unit is configured to start the key switching process after it is determined that the first new key is obtained by the receiver according to the second key update message while before the original becomes valid. The second key update message is sent by the receiver at a time instant when the receiver obtains the first new key.

The first key switching unit may set a specific starting time. For example, the first key switching unit may set that the key switching process is started at a time instant that is a second time interval after the second key update message is obtained, and the second time interval is not greater than a remaining valid period of the original key.

As it should be, the key switching process may also be set to be started at a time instant when data with the second data frame number is sent to the receiver. The second data frame number is set by the receiver and sent in the second key update message. The second data frame number is set to be greater than a current data frame number of the sender saved by the receiver. Since the second key update message has been received at a time instant when the second data frame number is known, that is, it is known that the receiver has obtained the first new key, the receiver can de-protect the data using the first new key when data with the second data frame number arrives at the receiver.

Several specific devices for starting the key switching process at a time instant when it is determined that the new key is obtained by the receiver are provided according to the seventh embodiment of the present disclosure.

First Device

The first key obtaining unit is configured to obtain the first new key according to the received third key update message, the third key update message is sent in a case that the receiver obtains the first new key earlier than the sender device, and the third key update message includes the second new key information.

The first key switching unit is configured to start the key switching process after it is determined that the first new key is obtained by the receiver according to the received third key update message while before the original key becomes invalid.

In a preferred embodiment of the present disclosure, the device further includes a key update request message sending unit.

The key update request message sending unit is configured to send a key update request message to the receiver before the first new key is obtained, such that the receiver sends the third key update message according to the key update request message.

In the above-described device, the first key obtaining unit varies depending on different forms of the second new keys.

For example, the first key obtaining unit is configured to obtain the first new key by de-protecting the second new key information in a case that the second new key information is a ciphertext generated by protecting the first new key using the shared information shared with the sender by the receiver.

For example, the first key obtaining unit is configured to obtain the third parameter by de-protecting the new key information and obtain the first new key according to the agreed key algorithm and the third parameter, in a case that the second new key information is a ciphertext generated by protecting the third parameter using the shared information shared with the sender; and the third parameter is a parameter for generating the first new key.

To further embody that the new key is agreed between the sender and the receiver, in a preferred embodiment of the present disclosure, the sender and the receiver may also generate the new key in conjunction with a random number generated by the sender.

In this case, the device further includes a second random number unit configured to generate a second random number. The first key obtaining unit is configured to obtain a fifth parameter by de-protecting the new key information and obtain the first new key using the agreed key algorithm, the second random number and the fifth parameter, in a case that the second new key information is a ciphertext generated by protecting a fifth parameter using the shared information shared with the sender. The fifth parameter is a parameter for generating the first new key, and the second random parameter is included in the key update request message.

Alternatively, the device further includes a third random number unit configured to generate a third random number. The first key obtaining unit is configured to obtain the first new key using the agreed key algorithm, a sixth parameter and the shared key shared with the receiver, in a case that the second new key information is a sixth parameter. The sixth parameter is a parameter for calculating the first new key in conjunction with the shared key of the receiver. The third random number is included in the key update request message.

The third parameter, the fourth parameter, the fifth parameter and the sixth parameter described above may have multiple forms. For example, there parameters may be obtained from a code book. As it should be, in consideration of security, they may be a fourth random number generated by the receiver.

Second Device

A fourth key update message sending unit is configured to construct a fourth key update message and send the fourth key update message to the receiver in a case that the sender device obtains the first new key earlier than the receiver, such that the receiver obtains the first new key according to the fourth key update message. The fourth key update message sending unit is similar to the first key update message sending unit, which will not be described in detail here.

A first key switching unit is configured to start the key switching process after it is determined that the first new key is obtained by the receiver according to the fifth key update message and before the original key becomes invalid. The fifth key update message is sent at a time instant when the receiver obtains the first new key according to the fourth key update message.

In the present disclosure, the first key switching unit may start the key switching process at a time instant that is a certain time interval after the fifth key update message is obtained. In a case that the time interval is zero, it is indicated that the first key switching unit starts the key switching process immediately after the fifth update message is obtained.

The fifth key update message mentioned in the above-described device is a message for notifying the sender that the receiver obtains the first new key. Accordingly, information on the first new key may not be included in this message, and the message is, such as a notification message of "the new key is obtained".

As it should be, in a preferred embodiment of the present disclosure, to facilitate the sender to verify whether the new key obtained by the receiver is correct, the receiver may set the first new key in the fifth key update message, such as "the first new key 5 has been obtained", then the sender may verify whether the first new key of the receiver is correct meanwhile. To prevent the fifth key update message including the first new key from being intercepted in transmission, the receiver may protect the fifth key update message using the shared information between the receiver and the sender. In a case that associated information on the new key is included in the fifth key update message, the fifth key update message may be a ciphertext generated by the receiver by encrypting the first new key using the shared information, or a ciphertext generated by the receiver by protecting the associated parameter received from the fourth key update message using the shared information.

After the key switching, the first new key becomes a current key, here the sender or the receiver saves the original key and the new key. To avoid that the current key cannot be determined accurately in subsequent update, in a preferred embodiment of the present disclosure, the first new key and the original key may be processed properly after the key switching to distinguish the new key and the original key. Correspondingly, the device further includes:

a first current key storage unit, a first original key deletion unit, or a first current key identifier unit.

The first current key storage unit is configured to store the first new key in a permanent storage area of the current key after the key switching process is started.

The first original key deletion unit is configured to delete the original key.

The current key identifier unit is configured to direct an identifier indicating the current key to the first new key.

Figure 7:
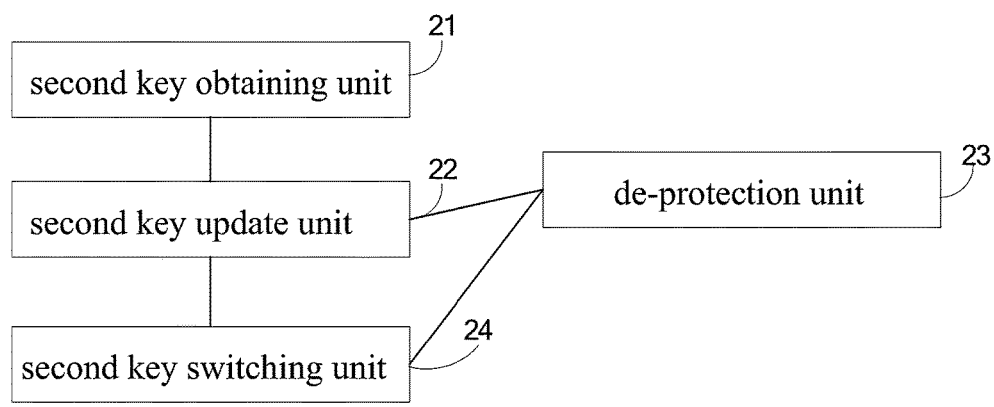
FIG. 7 is a structural diagram of a device according to an eighth embodiment of the present disclosure.

A receiver device for implementing one-way key switching is also provided according to an eighth embodiment of the present disclosure, referring to FIG. 7, and the device includes a second key obtaining unit 21, a second key update unit 22, a de-protection unit 23, and a second key switching unit 24.

The second key obtaining unit 21 is configured to obtain a second new key.

The second key update unit 22 is configured to set the second new key as available in the receiving direction on reception of the second new key, such that the sender starts the key switching process and sets the original key as unavailable in the sending direction and sets the second new key as available in the sending direction, after it is deduced or determined that the receiver obtains the second new key while before the original key becomes invalid.

The de-protection unit 23 is configured to select a valid key for de-protection from the second new key and the original key according to an identifier of data received from the sender. The de-protection unit selects the original key to conduct de-protection in a case that the protection identifier indicates that the data is protected using the original key; or the de-protection unit selects the second new key to conduct de-protection in a case that the protection identifier indicates that the data is protected using the second new key.

The protection identifier is a key identifier, a key index or other information, and is configured to identify that the data is protected using which key.

Additionally, the packet loss often occurs in communication process. Accordingly, the data which is de-protected by the de-protection unit successfully using the second new key for the first time may not be the first data which is protected using the second new key and sent by the sender.

The second key switching unit 24 is configured to start the key switching process and set the original key as unavailable in the receiving direction when the data is successfully de-protected using the second new key for the first time while before the original becomes invalid.

As it should be, the skilled in the art may know that only the second new key is available for the de-protection unit 23 after the key switching. Accordingly, the de-protection unit 23 uses the second new key to de-protect the received data after the key switching.

In the present disclosure, the second key obtaining unit may obtain the new key in various ways. In a specific embodiment, in a case that the sender obtains the second new key earlier than the receiver device, the sender may send a first key update message including the first new key information. In this case, the second key obtaining unit is configured to obtain the second new key according to the received first key update message.

The first new key information in the first key update message sent by the sender may have various forms, and the second key obtaining unit varies depending on the different forms.

For example, in a case that the first new key information is a ciphertext generated by the sender by protecting the second new key using the shared information shared with the receiver, the second key obtaining unit is configured to obtain the second new key by de-protecting the first new key information.

For example, in a case that the first new key information is a ciphertect generated by the sender by protecting the first parameter such as a first notification master key NMK using the shared information shared with the receiver, the second key obtaining unit is configured to obtain the first parameter by de-protecting the first new key information, and obtain the second new key using the agreed key algorithm and the first parameter. The first parameter is a parameter for generating the second new key.

For example, in a case that the first new key information is the second parameter, the second key obtaining unit is configured to obtain the second new key using the agreed key algorithm, the second parameter and the shared key shared with the sender. The second parameter is a parameter for calculating the second new key in conjunction with the shared key shared with the sender.

In a specific embodiment, the first parameter or the second parameter may have various forms. For example, the first parameter or the second parameter may be obtained from a code book. As it should be, in consideration of security, the first parameter or the second parameter may be a first random number generated by the sender.

In a specific embodiment of the present disclosure, to notify the sender that the new key is obtained, the device further includes a second key update message sending unit.

The second key update message sending unit is configured to send a second key update message to the sender at a time instant when the second new key is obtained, such that the senders starts the key switching process after the sender determines that the receiver has obtained the second new key according to the second key update message while before the original key becomes invalid.

Specifically, the second key update message sending unit is configured to send the second key update message including the second data frame number to the sender, such that the sender starts the key switching process at a time instant when data with the second frame number is sent. The second data frame number is set to be greater than a current data frame number of the sender saved by the receiver.

The second key obtaining unit may obtain the second new key earlier than the sender, or may obtain the second new key later than the sender.

In a case that the second key obtaining unit obtains the second new key earlier than the sender, the second key update message sending unit includes a third key update message sending unit configured to send the third key update message to the sender, such that the sender obtains the second new key according to the third key update message. The third key update message includes the second new key information.

If the sender sends the key update request message before the second new key is obtained, the third key update message sending unit may send the third key update message to the sender according to the key update request message in a case that the receiver device obtains the second new key earlier than the sender.

In order to ensure security of the second new key information, in a specific embodiment of the present disclosure, the device further includes a second new key unit.

The device further includes a second new key unit configured to generate the second new key information by protecting the second new key using the shared information shared with the sender.

Alternatively, the device further includes a third parameter unit configured to generate the second new key information by protecting the third parameter using the shared information shared with the sender. The third parameter is a parameter for generating the second new key.

The second key obtaining unit is configured to obtain the second new key using the agreed key algorithm and the third parameter.

Alternatively, the second key obtaining unit is configured to obtain the new key using the agreed key algorithm, the fourth parameter and the shared key in a case that the second new key information is the fourth parameter. The fourth parameter is a parameter for calculating the new key in conjunction with the shared key shared with the sender.

To further embody that the new key is agreed between the sender and the receiver, in a preferred embodiment of the present disclosure, the second new key may also be generated in conjunction with a random number generated by the sender.

Specifically, the device further includes a fifth parameter unit configured to generate the second new key information by protecting the fifth parameter using the shared information shared with the sender. The fifth parameter is a parameter for generating the second new key.

The second key obtaining unit is configured to obtain the second new key using the agreed key algorithm, the fifth parameter and a second random number which is generated by the sender. The second random number is included in the key update request message.

Alternatively, the second key obtaining unit is configured to obtain the second key using the agreed key algorithm, a sixth parameter, a third random number which is generated by the sender and the shared key shared with the sender. The sixth parameter is a parameter for calculating the second new key in conjunction with the shared key between the receiver and the sender, and the third random number is included in the key update request message.

The third parameter, the fourth parameter, the fifth parameter and the sixth parameter described above may have various forms. For example, these parameters may be obtained from a code book. As it should be, in consideration of security, these parameters may be a fourth random number generated by the fourth random number unit of the receiver.

The second key obtaining unit is configured to obtain the new key according to the fourth key update message in a case that the second key obtaining units obtains the second new key later than the sender. The fourth key update message is sent in a case that the sender obtains the second new key earlier than the receiver device.

The second key update message sending unit includes a fifth key update message sending unit configured to send a fifth key update message to the sender after the second new key is obtained according to the fourth key update message, such that the sender starts the key switching process after it is determined that the second new key is obtained by the receiver according to the fifth key update message.

The fourth key update message is similar to the first key update message, and for the device, the process of obtaining the new key according to the fourth key update message is similar to the process of obtaining the second new key according to the fourth key update message, which are not described in detail here.

The fifth key update message mentioned in the above-described device is configured to notify the sender that the second new key is obtained. Accordingly, associated information on the new key may not be included in the message, the message is, such as a notification message of "the new key is obtained".

As it should be, in a preferred embodiment of the present disclosure, the new key may be set in the fifth key update message, such as "the new key 5 has been obtained". To prevent the message including the second new key from being intercepted in transmission, the message may be protected using the shared information between the receiver and the sender. In a case that associated information on the second new key is included in the fifth key update message, the fifth key update message may be a ciphertect generated by protecting the second new key using the shared information, or a ciphertext generated by protecting associated parameters received from the fourth key update message using the shared information. For the details, reference may be made to the third key update message.

After the key switching, the second new key becomes a current key, here the sender or the receiver save the original key and the second new key. To avoid that the current key cannot be determined accurately in a subsequent update, in a preferred embodiment of the present disclosure, the second key and the original key may be processed properly after the key switching to distinguish the new key and the original key. Correspondingly, the device further includes:

a second current key storage unit, a second original key deletion unit, or a second current key identifier unit.

The second current key storage unit is configured to store the second new key in a permanent storage area of the current key after the key switching process is started.

The second original deletion unit is configured to delete the original key.

The second current key identifier unit is configured to direct an identifier indicating the current key to the second new key.

Corresponding to the method and the device according to the present disclosure, a system for implementing one-way switching is provided according to the embodiment of the present disclosure, and the system includes a sender and a receiver.

The sender is configured to set the new key as unavailable in the sending direction on reception of the new key.

The sender is also configured to protect data to be sent to the receiver using the original key after the new key is set as unavailable in the sending direction.

The sender is also configured to start the key switching process and set the original key as unavailable in the sending direction and the new key as available in the sending direction after it is deduced or determined that the receiver has obtained the new key.

The sender is also configured to protect data to be sent to the receiver using the new key in a case that the original key is set as unavailable in the sending direction and the new key is set as available in the sending direction.

The receiver is configured to set the new key as available in the receiving direction on reception of the new key.

The receiver is also configured to select a valid key for de-protection from the second new key and the original key according to a protection identifier of data received from a sender, wherein the de-protection unit selects the original key to conduct de-protection in a case that the protection identifier indicates that the data is protected using the original key; or the de-protection unit selects the second new key to conduct de-protection in a case that the protection identifier indicates that the data is protected using the second new key; and The receiver is also configured to start a key switching process and set the original key as unavailable in the receiving direction, after the data is successfully de-protected using the second new key for the first time while before the original key becomes invalid.

In practice, one entity generally has both a function of sending and a function of receiving. Accordingly, the sender device and the receiver device for implementing one-way key switching according to the above-described embodiment of the present disclosure may be integrated in a same entity.

Correspondingly, a device for implementing one-way key switching is provided according to the ninth embodiment of the present disclosure, the device includes the receiver device and the sender device for implementing one-way key switching in the above-described embodiment.

Figure 8:
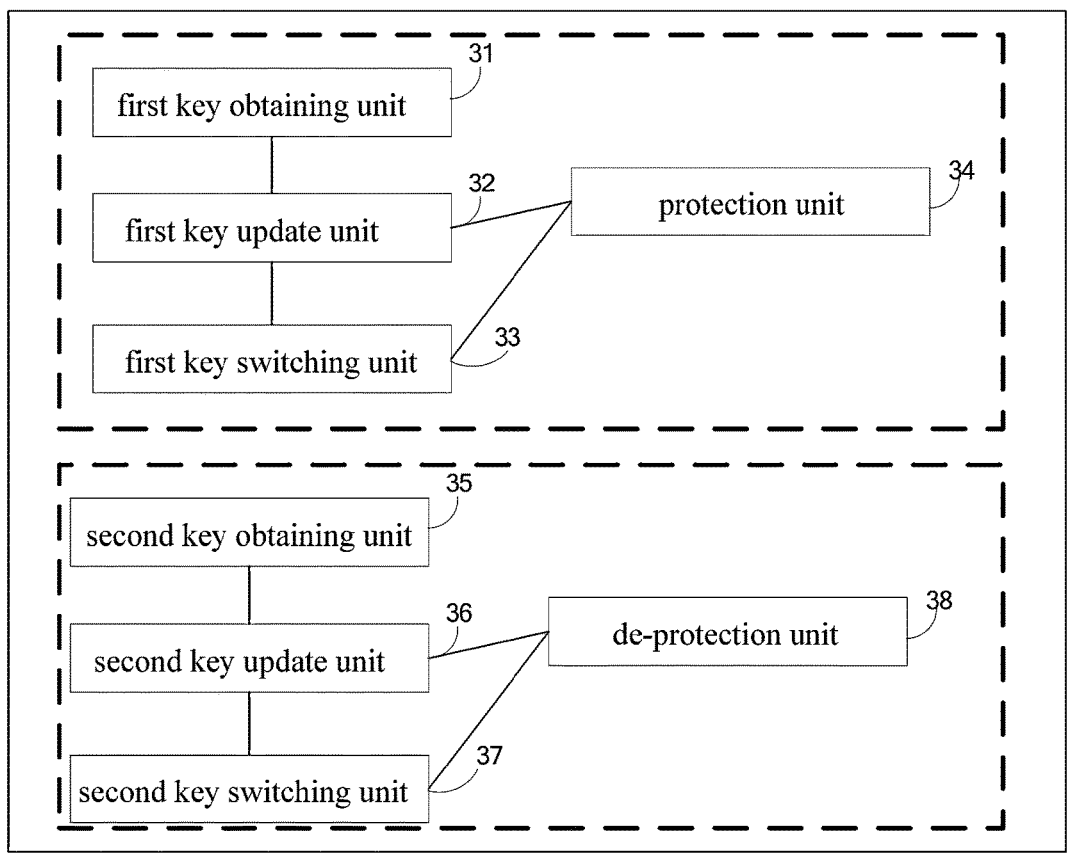
FIG. 8 is a structural diagram of a device according to a ninth embodiment of the present disclosure.

FIG. 8 is a specific structural diagram of the device according to a ninth embodiment, the device including a first key obtaining unit 31, a first key update unit 32, a first key switching unit 33, a protection unit 34, a second key obtaining unit 35, a second key update unit 36, a de-protection unit 37, and a second key switching unit 38.

The first key obtaining unit 31 is configured to obtain a first new key.

The first key update unit 32 is configured to set the new key as unavailable in the sending direction at a time instant when the first new key is obtained.

The first key switching unit 33 is configured to start a key switching process after it is deduced or determined that the receiver has obtained the first new key, while before the original key becomes invalid, and set the original key as unavailable in the sending direction and set the new key as available in the sending direction. The receiver sets the new key as available in the receiving direction on reception of the first new key.

The protection unit 34 is configured to protect data to be sent to the receiver using the original key after the first new key is set as unavailable in the sending direction; the protection unit also configured to and protect the data to be sent to the receiver using the first new key in a case that the original key is set as unavailable in the sending direction and the first new key is set as available in the sending direction.

The second key obtaining unit 35 is configured to obtain the second new key.

The second key update unit 36 is configured to set the new key as available in a receiving direction on reception of the second new key, such that the sender starts the key switching process and sets the original key as unavailable in the sending direction and sets the new key as available in the sending direction after it is deduced or determined that the receiver has obtained the second new key while before the original key becomes invalid.

The de-protection unit 37 is configured to select a valid key for de-protection from the second new key and the original key according to a protection identifier of data received from a sender, wherein the de-protection unit selects the original key to conduct de-protection in a case that the protection identifier indicates that the data is protected using the original key; or the de-protection unit selects the second new key to conduct de-protection in a case that the protection identifier indicates that the data is protected using the second new key.

The second key switching unit 38 is configured to start a key switching process and set the original key as unavailable in the receiving direction, after the data is successfully de-protected using the second new key for the first time while before the original key becomes invalid.

In the present disclosure, since the key is one-way key, the first new key is different from the second new key when they are in a same entity.

In the present disclosure, the sender device and the receiver device may be in one entity, or may be in different entities. If an entity is only used to protect data to be sent from itself, there is a sender device of the present disclosure in the entity; if an entity is only used to protect data received by itself, there is a receiver device of the present disclosure in the entity; if an entity is used to protect data to be sent from itself and dada received by itself, it is necessary for the entity to have the sender device and the receiver device. If an entity needs to protect unicast data to be sent from itself to an entity C and unicast data to be sent from itself to an entity D, the entity C and the entity D correspond to different keys respectively.

It is to be noted that the method of the present disclosure corresponds to the device and the system of the present disclosure, so the device and the system will no longer be described in detail, the relevant sections may be referenced to the method embodiment. The embodiments of the present disclosure are explained in detail as above, the present disclosure is set forth by specific embodiments herein, and explanation of the above embodiments is used to help understanding of the device, the system and the method of the present disclosure. Meanwhile, those skilled in the art may change specific embodiments and application range according to spirit of the present disclosure. In summary, the content of the present disclosure should not be interpreted to limit the present disclosure.

The invention claimed is:

1. A one-way key switching method, comprising:
   setting a new key as unavailable in a sending direction and keeping an original key as available in the sending direction by a sender after the new key is obtained, before it is deduced or determined that the new key is obtained by at least n receivers;
   starting a key switching process by the sender after the new key is obtained and it is deduced or determined that the new key is obtained by at least n receivers, while before the original key becomes invalid, wherein the switching process comprises setting the original key as unavailable in the sending direction and setting the new key as available in the sending direction, where N≥n≥1, N is a total number of the receivers corresponding to the sender;

setting the new key as available in a receiving direction and keeping the original key as available in the receiving direction by the receiver when the new key is obtained;

receiving, by the receiver, data sent by the sender, and selecting, by the receiver, a valid key from the original key and the new key according to a protection identifier of the data to de-protect the data; and starting, by the receiver, a key switching process, after the data is successfully de-protected using the new key for the first time while before the original key becomes invalid, wherein the switching process comprises setting the original key as unavailable in the receiving direction and keeping the new key as available in the receiving direction.

2. The method according to claim 1, further comprising:

generating, by the sender, first new key information according to the new key and sending, by the sender, a first key update message comprising the first new key information to the receiver, in a case that the sender obtains the new key earlier than the receiver, wherein the process of starting a key switching process by the sender, after it is deduced that the new key is obtained by at least n receivers while before the original key becomes invalid comprises:

starting, by the sender, the key switching process at a time instant that is a first time interval after the first key update message is sent, wherein the first time interval is greater than a transmission delay taken by arrival of the first key update message to the receiver and not greater than a remaining valid period of the original key; or wherein the process of starting a key switching process by the sender, after it is deduced that the new key is obtained by at least n receivers while before the original key becomes invalid comprises:

starting, by the sender, the key switching process at a time instant when data with a first data frame number is sent to the receiver, wherein the first data frame number is greater than the maximum of data frame numbers used by the sender before the first key update message is sent, and a time interval between the time instant when the data with the first data frame number is sent and the time instant when the first key update message is sent is greater than a transmission delay of the first key update message;

wherein the process of obtaining the new key by the receiver comprises:

obtaining, by the receiver, the new key according to the first new key information in the first key update message.

3. The method according to claim 1, further comprising:

sending a second key update message to the sender by the receiver when the new key is obtained, wherein the process of starting a key switching process by the sender, after it is determined that the new key is obtained by at least n receivers while before the original key becomes invalid comprises:

starting, by the sender, the key switching process at a time instant that is a second time interval after the second key update message is received, wherein the second time interval is not greater than a remaining valid period of the original key; or wherein the method further comprises:

sending a second key update message comprising a second data frame number to the sender by the receiver when the new key is obtained, wherein the second data frame number is set by the receiver, wherein the process of starting a key switching process by the sender, after it is determined that the new key is obtained by at least n receivers while before the original key becomes invalid comprises:

starting, by the sender, the key switching process at a time instant when data with the second data frame number is sent to the receiver, wherein the second data frame number is greater than a current value of a data frame number of the sender which is saved by the receiver.

4. The method according to claim 1, further comprising:

generating, by the receiver, second new key information according to the new key and sending, by the receiver, a third key update message comprising the second new key information to the sender, in a case that the receiver obtains the new key earlier than the sender, wherein the process of obtaining, by the sender, the new key comprises:

obtaining, by the sender, the new key according to the second new key information in the third key update message, wherein the process of starting a key switching process by the sender, after it is determined that the new key is obtained by at least n receivers while before the original key becomes invalid comprises:

sending, by the sender, the key switching process at a time instant that is a second time interval after the third key update message is received, wherein the second time interval is not greater than a remaining valid period of the original key; or wherein the process of starting a key switching process by the sender, after it is determined that the new key is obtained by at least n receivers while before the original key becomes invalid comprises:

sending, by the sender, the key switching process at a time instant when data with the second data frame number is sent to the receiver, wherein the second data frame number is greater than a current value of a data frame number of the sender which is saved by the receiver.

5. The method according to claim 1, further comprising:

sending, by the sender, a fourth key update message comprising first new key information to the receiver, in a case that the sender obtains the new key earlier than the receiver; and sending, by the receiver, a fifth key update message to the sender after the new key is obtained according to the fourth key update message, wherein the process of obtaining the new key by the receiver comprises:

obtaining, by the receiver, the new key according to the fourth key update message, wherein the process of starting a key switching process by the sender, after it is determined that the new key is obtained by at least n receivers and before the original key becomes invalid comprises:

starting, by the sender, the key switching process at a time instant that is a second time interval after the fifth key update message is received, wherein the second time interval is not greater than a remaining valid period of the original key; or wherein the process of starting a key switching process by the sender, after it is determined that the new key is obtained by at least n receivers while before the original key becomes invalid comprises:
starting, by the sender, the key switching process at a time instant when data with a second data frame number is sent to the receiver, wherein the second data frame number is greater than a current value of the data frame number of the sender which is saved by the receiver.

6. The method according to claim 4, further comprising:
sending, by the sender, a key update request message to the receiver before the new key is obtained,
wherein the process of sending, by the receiver, the third key update message comprising the second new key information to the sender comprises:
sending, by the receiver, the third key update massage to the sender according to the key update request message.

7. The method according to claim 1, further comprising:
storing, by the sender, the new key in a permanent storage area of a current key, deleting, by the sender, the original key, or directing, by the sender, an identifier indicating a current key to the new key after the sender starts the key switching process; and
storing, by the receiver, the new key in the permanent storage area of the current key, deleting, by the receiver, the original key, or directing, by the receiver, the identifier indicating the current key to the new key, after the receiver starts the key switching process.

8. A sender device for implementing one-way key switching, comprising at least one processor and a memory having processor-executable instructions stored therein, and the instructions when executed by the at least one processor, configure the device to:
obtain a first new key;
set the first new key as unavailable in a sending direction and keep an original key as available in the sending direction after the first new key is obtained while before it is deduced or determined that the new key is obtained by at least n receivers;
start a key switching process after the first new key is obtained and it is deduced or determined that the new key is obtained by at least n receivers, while before the original key becomes invalid, wherein the switching process comprises setting the original key as unavailable in the sending direction and setting the first new key as available in the sending direction, where N≥n≥1, N is a total number of the receivers corresponding to the sender; and
protect data to be sent to the receiver using the original key, in a case that the first new key is set as unavailable in the sending direction and the original key is set as available in the sending direction, and protect the data to be sent to the receiver using the first new key, in a case that the original key is set as unavailable in the sending direction and the first new key is set as available in the sending direction, in order for the receiver to set the original key as unavailable in the receiving direction and the new key as available in the receiving direction after the receiver using the new key to successfully de-protect the data for the first time.

9. The sender device according to claim 8, wherein the device is further configured to:
generate first new key information according to the new key and send a first key update message comprising the first new key information to the receiver in a case that the sender device obtains the first new key earlier than the receiver, thereby the receiver obtains the first new key according to the new key information in the first key update message,
wherein the key switching process is started at a time instant that is a first time interval after the first key update message is sent, wherein the first time interval is greater than a transmission delay taken by arrival of the first key update message to the receiver and not greater than a remaining valid period of the original key, or
the key switching process is started at a time instant when data with a first data frame number is sent to the receiver, wherein the first data frame number is greater than the maximum of data frame numbers used before the first key update message is sent, and the time interval between the time instant when the data with the first data frame number is sent and the time instant when the first key update message is sent is greater than a transmission delay taken by arrival of the first key update message to the receiver.

10. The sender device according to claim 8,
wherein the device is further configured to
receive a second key update message which is sent by the receiver when the first new key is obtained,
wherein the key switching process is started at a time instant that is a second time interval after the second key update message is received, wherein the second time interval is not greater than a remaining valid period of the original key; or
receive a second key update message comprising a second data frame number, which is sent by the receiver when the first new key is obtained, wherein the second data frame number is set by the receiver,
wherein the key switching process is started at a time instant when data with the second data frame number is sent to the receiver, wherein the second data frame number is greater than a current data frame number of the sender which is saved by the receiver.

11. The sender device according to claim 8, wherein the device is further configured to:
receive a third key update message comprising second new key information, which is sent by the receiver in a case that the receiver obtains the first new key earlier than the sender device,
wherein the first new key is obtained according to the second new key information in the received third key update message; and
the key switching process is started at a time instant that is a second time interval after the third key update message is received, wherein the second time interval is not greater than a remaining valid period of the original key; or
the key switching process is started at a time instant when data with the second data frame number is sent to the receiver, wherein the second data frame number is greater than a current value of a data frame number of the sender which is saved by the receiver.

12. The sender device according to claim 8, wherein the device is further configured to:
send a fourth key update message comprising first new key information to the receiver in a case that the sender device obtains the second new key earlier than the receiver; and
receive a fifth key update message which is sent by the receiver after the new key is obtained according to the fourth key update message, wherein the key switching process is started at a time instant that is a second time interval after the fifth key update message is received, wherein the second time interval is not greater than a remaining valid period of the original key; or the first key switching unit is configured to start the key switching process is started at a time instant when data with the second data frame number is sent to the receiver, wherein the second data frame number is greater than a current data frame number of the sender which is saved by the receiver.

13. The sender device according to claim 11, wherein-the device is further configured to:
send a key update request message to the receiver before the first new key is obtained, thereby the receiver sends the third key update message according to the key update request message.

14. A receiver device for implementing one-way key switching, comprising at least one processor and a memory having processor-executable instructions stored therein, and the instructions when executed by the at least one processor, configure the device to:
obtain a second new key;
set the second new key as available in a receiving direction and keep an original key as available in the receiving direction when the second new key is obtained;
select a valid key for de-protection from the second new key and the original key according to a protection identifier of data received from a sender, wherein the de-protection unit selects the original key to conduct de-protection in a case that the protection identifier indicates that the data is protected using the original key; or the de-protection unit selects the second new key to conduct de-protection in a case that the protection identifier indicates that the data is protected using the second new key; and
to start a key switching process and set the original key as unavailable in the receiving direction, after the data is successfully de-protected using the second new key for the first time while before the original key becomes invalid.

15. The receiver device according to claim 14, wherein the device is further configured to:
receive a first key update message comprising first new key information, which is sent by the sender in a case that the sender obtains the second new key earlier than the receiver device,
wherein the second new key is obtained according to the first new key information in the received first key update message.

16. The receiver device according to claim 14, wherein the device is further configured to:
send a second key update message to the sender when the second new key is obtained, thereby the sender starts the key switching process after it is determined that the second new key is obtained by the receiver according to the second key update message while before the original key becomes invalid; or
send the second key update message comprising a second data frame number to the receiver, wherein the sender starts the key switching process at a time instant when data with the second data frame number is sent, wherein the second data frame number is greater than a current data frame number of the sender which is saved by the receiver.

17. The receiver device according to claim 14, wherein the device is further configured to:
send a third key update message comprising second new key information to the sender in a case that the receiver device obtains the second new key earlier than the sender, wherein the sender obtains the second new key according to the third key update message.

18. The receiver device according to claim 14, wherein the device is further configured to:
receive a fourth key update message comprising second new key information which is sent by the sender in a case that the sender obtains the second new key earlier than the receiver device, and send a fifth key update message to the sender when the second new key is obtained according to the second new key information in the fourth key update message, wherein the sender starts the key switching process after it is determined that the second new key is obtained by the receiver according to the fifth key update message while before the original key becomes invalid,
wherein the second new key is obtained according to the fourth new key information in the fourth key update message.

19. The receiver device according to claim 17, wherein the device is further configured to:
receive a key update request message which is sent by the sender before the second new key is obtained,
wherein a third update message is sent to the sender on reception of the key update request message.

* * * * *